United States Patent
Oya et al.

(10) Patent No.: US 6,557,761 B1
(45) Date of Patent: May 6, 2003

(54) CARD DETECT SWITCH FOR CARD CONNECTOR

(75) Inventors: Masaaki Oya, Kanagawa (JP); Eiji Matsuda, Chiba (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 09/711,946

(22) Filed: Nov. 15, 2000

(30) Foreign Application Priority Data

Nov. 16, 1999 (JP) .......................................... 11-325795

(51) Int. Cl.⁷ ........................... G06K 7/06; G06K 19/06
(52) U.S. Cl. ........................................ 235/441; 235/492
(58) Field of Search ................................. 235/441, 492; 439/489, 188

(56) References Cited

U.S. PATENT DOCUMENTS

| | | | | |
|---|---|---|---|---|
| 5,157,244 A | * | 10/1992 | Mroczkowski et al. | ..... 235/441 |
| 5,703,346 A | * | 12/1997 | Bricaud et al. | ............. 235/441 |
| 5,743,766 A | * | 4/1998 | Kaneshige et al. | ......... 235/441 |
| 5,945,662 A | * | 8/1999 | Vallat | .......................... 235/441 |
| 5,997,345 A | * | 12/1999 | Inadama | ..................... 439/489 |
| 6,059,592 A | * | 5/2000 | Inadama | ..................... 235/441 |
| 6,267,619 B1 | * | 7/2001 | Nishioka | ..................... 439/489 |

* cited by examiner

Primary Examiner—Thien M. Le
Assistant Examiner—April Nowlin
(74) Attorney, Agent, or Firm—Finnegan, Henderson, Farabow, Garrett & Dunner LLP

(57) ABSTRACT

A predetermined contact pressure required between the two metal pieces 60, 70 when they are come into contact with each other is produced by a pressing force of the two metal pieces 60, 70 acting in the direction of height or width of the connector 1. This arrangement prevents the inserted card from coming off and reliably and stably holds the inserted card.

4 Claims, 9 Drawing Sheets

BEFORE THE CARD IS INSERTED

FIG.1

FIG.2 BEFORE THE CARD IS INSERTED

FIG.3

AFTER THE CARD IS INSERTED
FIG.4

BEFORE THE CARD IS INSERTED

FIG.5A  FIG.5B

AFTER THE CARD IS INSERTED

FIG.6A  FIG.6B

BEFORE THE CARD IS INSERTED
FIG.7

AFTER THE CARD IS INSERTED
FIG.8

BEFORE THE CARD IS INSERTED

FIG.9A  FIG.9B

AFTER THE CARD IS INSERTED

CARD DETECT SWITCH FOR CARD CONNECTOR

This application is based on Patent Application No. 11-325795 filed Nov. 16, 2000 in Japan, the content of which is incorporated hereinto by reference.

BACKGROUND OF THE INVENTION

1. Field of the Invention

The present invention relates to a card connector for connecting an IC card to electronic devices, such as cellular phones, telephones, PDAs (personal digital assistance), portable audio devices and cameras, and more specifically to a card detect switch for a card connector which checks for the presence or absence of an IC card.

2. Description of the Related Art

In electronic devices such as cellular phones, telephones, PDAs and cameras, a variety of functions are added by inserting an IC card with a built-in memory or control IC, such as a SIM (subscriber identity module) card, an MMC (multimedia card), a Smart Media (trademark) card and an SD (secure digital or super density) card.

In a connector structure for removably inserting such an IC card, a plurality of contact terminals made of a metal leaf spring are provided in a connector housing to make contact with a plurality of contact pads formed on the front or back surface of the inserted IC card, so that the IC card is electrically connected to the electronic device having that connector. The contact pads of the IC card include a power supply pad connected to a power supply line and a plurality of signal pads for transmitting/receiving various signals. These contact pads are connected via the contact terminals of the card connector to a power supply circuit and various signal process circuits in the electronic device.

In the electronic devices that insert the IC card of this kind, there are many occasions where the user wishes to check whether the card is inserted or not. To meet this requirement a card detect switch needs to be provided in the card connector to check for the presence or absence of the inserted card.

A possible sensor structure for this purpose may include a light sensing type. The light sensing type, however, cannot be expected to provide a satisfactory level of detection precision as the card is becoming smaller in size and thickness. Another problem of the light sensing type is that the placement of an optical sensor becomes a hindrance to reductions in size and cost. Thus a technique utilizing the contact/separation of a contact leaf spring is considered the most promising system overall.

The conventional card detect switch using the contact leaf spring has the following construction, for example.

The card detect switch has two metal pieces installed inside an abutment wall against which the front face of the card inserted in the card connector is pressed. For example, one of the metal pieces is a cantilevered contact leaf spring that elastically deforms in the card insertion direction and the other metal piece is a stationary metal switch component with which a contact portion of the contact leaf spring is come into or out of contact. When the card is not inserted, the contact leaf spring and the stationary switch component are parted. When the card is inserted, the pressing force of the front face of the card elastically deforms the contact leaf spring, causing the contact portion of the contact leaf spring to be pressed against the stationary switch component.

In this way, the conventional switch structure elastically deforms the contact leaf spring in the card insertion direction to press it against the stationary switch component to come them into contact with each other. In other words, in the conventional structure, the contact pressure between the two metal pieces is secured by the pressing force in the card insertion direction.

In the switch structure of this kind, an appropriate contact pressure between the two metal pieces is required to ensure an electrical stability of the switch when closed. In the conventional structure described above, because the contact pressure between the two metal pieces is secured by the pressing force of the card in the card insertion direction, the final card insertion position in the connector is set so that the contact leaf spring is pushed a small distance (a fraction of a millimeter) from the position where the both metal pieces start contacting each other, in order to produce an appropriate contact pressure.

Hence, in the conventional art, the contact leaf spring is additionally deformed elastically by the distance mentioned above and the resulting reactionary force acts on the card. The recovery force of the contact leaf spring may become too large, resulting in the inserted card coming out easily. Thus, a countermeasure needs to be taken, such as the provision of a brake piece for preventing the card from coming off.

The present invention has been accomplished under these circumstances to solve these problems and provides a card detect switch of a card connector that prevents an inserted card from coming off and securely holds it.

SUMMARY OF THE INVENTION

When viewed from one aspect, the present invention provides a card detect switch of a card connector for checking the insertion of a card into the card connector according to whether two metal pieces that respond to the insertion/retraction of the card engage or disengage, comprising: a first metal piece elastically deformable in a card insertion direction and in a card thickness direction and having a first contact surface disposed almost parallel to top and bottom surfaces of the card being inserted; and a second metal piece having a second contact surface almost parallel to the first contact surface; wherein when the card is inserted, the first contact surface of the first metal piece that is elastically deformable in the card insertion direction and the second contact surface of the second metal piece are brought into sliding contact.

In this invention, when the card is inserted, the first metal piece elastically deforms in the card insertion direction. As a result of this elastic deformation, the contact surface of the first metal piece moves to a position of the second contact surface of the second metal piece. Then, the first contact surface and the second contact surface come into sliding contact with each other. The first and second contact surfaces are arranged perpendicular to the card thickness direction, so that the two metal pieces engage each other with a pressing force acting in the card thickness direction, i.e., in the connector height direction.

When viewed from another aspect, the present invention provides a card detect switch of a card connector for checking the insertion of a card into the card connector according to whether two metal pieces that respond to the insertion/retraction of the card engage or disengage, the card detect switch comprising: a first metal piece elastically deformable in a card insertion direction and in a card width direction and having a first contact surface disposed almost perpendicular to top and bottom surfaces of the card being inserted; and a second metal piece having a second contact surface almost parallel to the first contact surface; wherein when the card is inserted, the first contact surface of the first metal piece that is elastically deformable in the card insertion direction and the second contact surface of the second metal piece are brought into sliding contact.

In this invention, because the first and second contact surfaces are arranged perpendicular to the card width direction, the two metal pieces engage each other with a pressing force acting in the card width direction, i.e., in the connector width direction.

As described above, a predetermined contact pressure required between the first and second metal pieces when they engage is produced by a pressing force of the two metal pieces acting either in the connector height direction (card thickness direction) or in the connector width direction (card width direction). In this invention, therefore, there is no need to additionally deform the first metal piece elastically, as is required with the conventional art, to produce a required contact pressure. This in turn prevents the reactionary force of the first metal piece from becoming too large. As a result, this invention eliminates the need to provide a brake piece for preventing the card from coming off and thus can stably and reliably hold the card in the connector.

The above and other objects, features and advantages of the present invention will become more apparent from the following description of embodiments thereof taken in conjunction with the accompanying drawings.

DESCRIPTION OF THE PREFERRED EMBODIMENTS

Now, embodiments of this invention will be described in detail by referring to the accompanying drawings.

Figure 1:
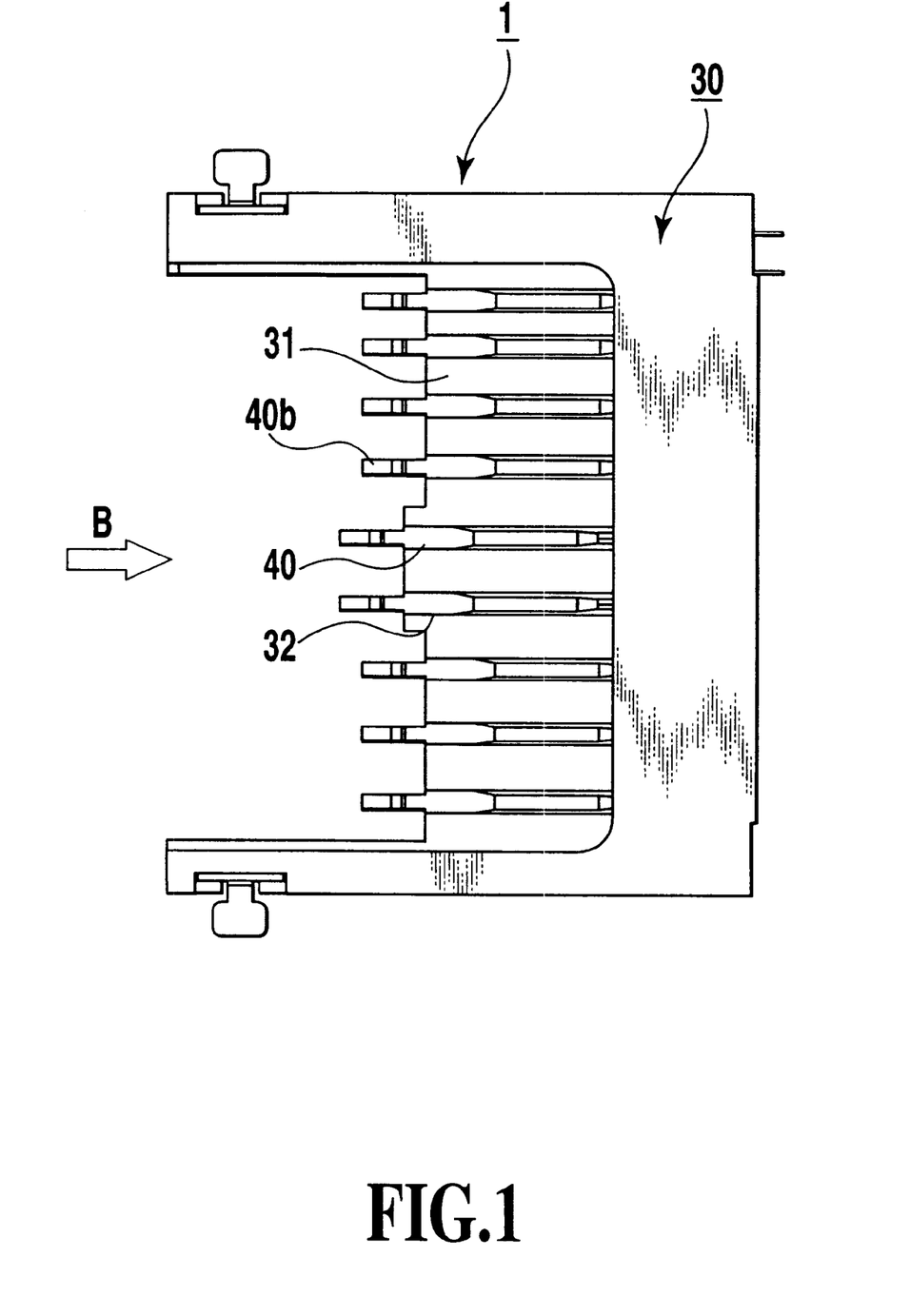
FIG. 1 is a plan view of a card connector as one embodiment of the present invention.
Figure 2:
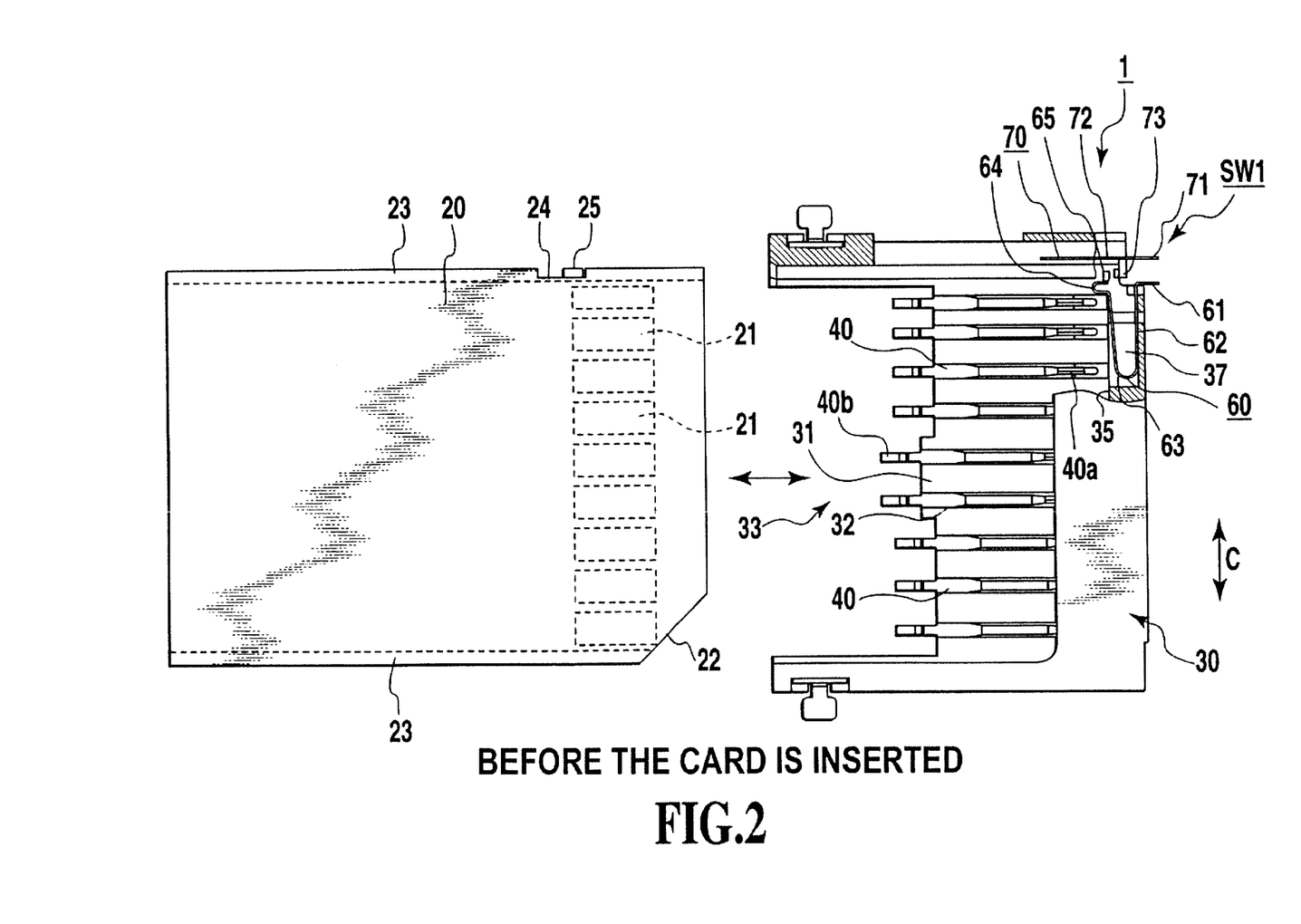
FIG. 2 is a partly cutaway plan view of the card connector according to the embodiment of the invention.
Figure 3:
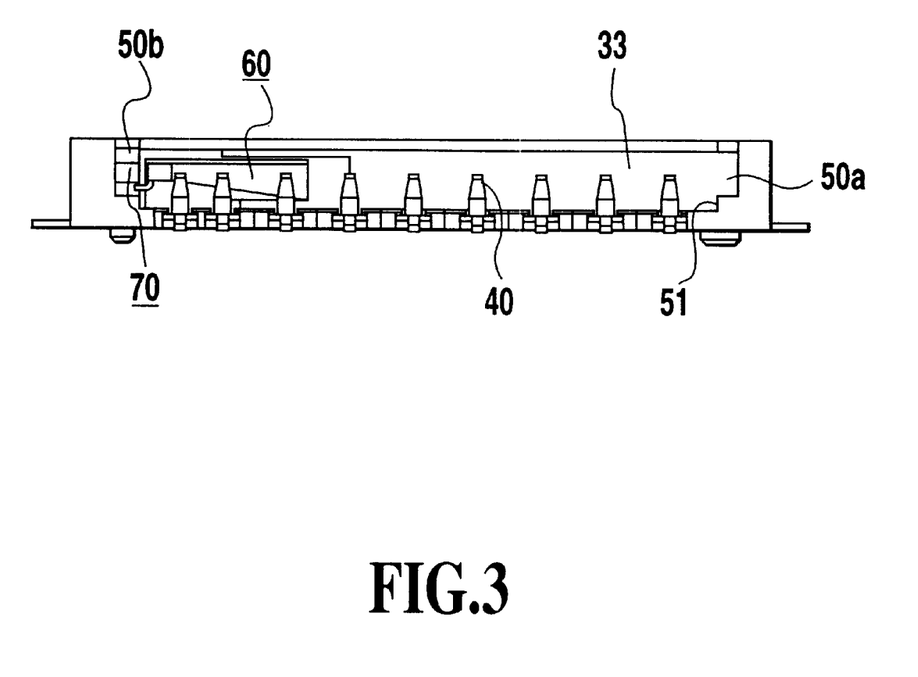
FIG. 3 is a front view of the card connector according to the embodiment of the invention.
Figure 4:
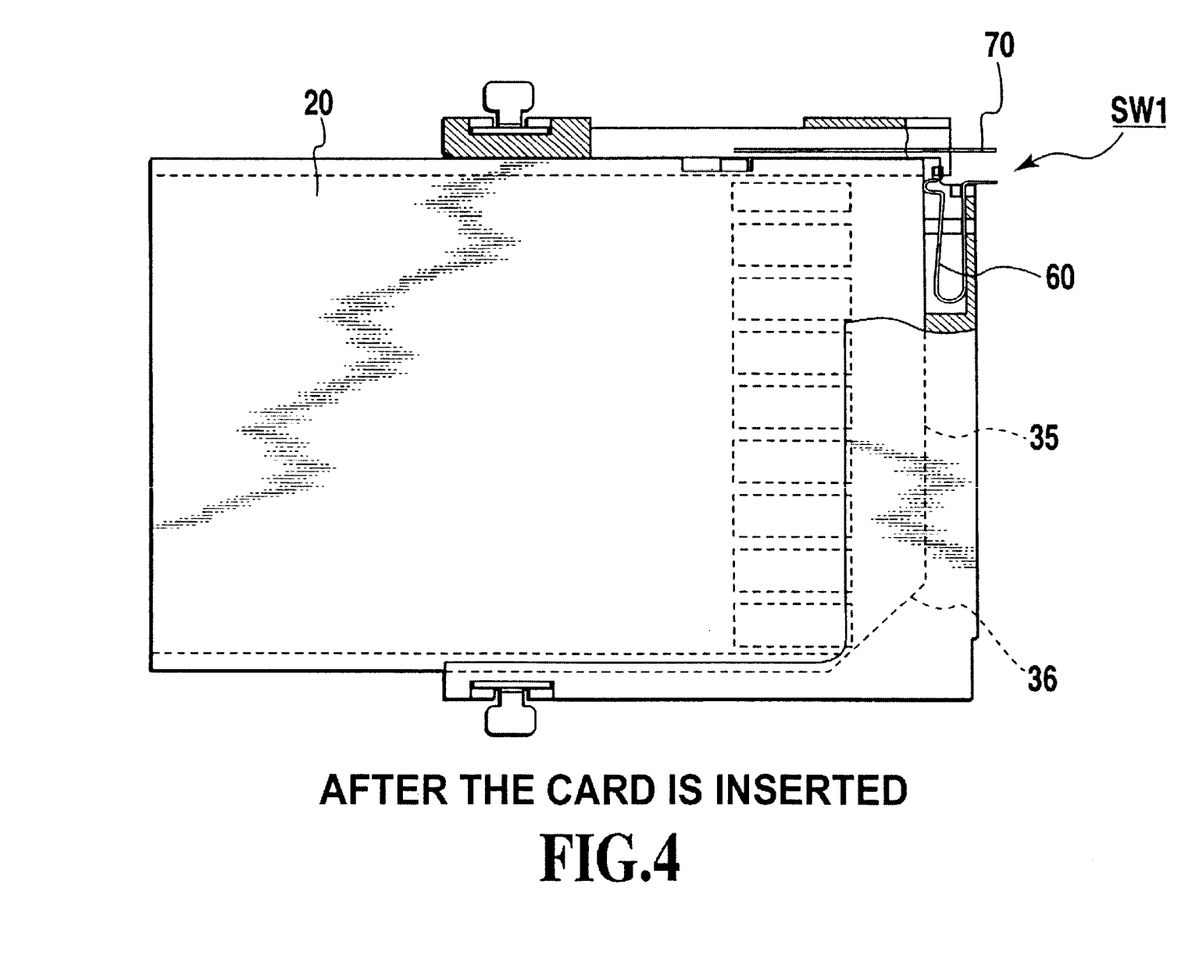
FIG. 4 is a partly cutaway plan view of the card connector according to the embodiment of the invention when a card is inserted.

FIG. 1 is an external plan view of the card connector as one embodiment of this invention. FIG. 2 is a partly cutaway plan view showing an essential portion of the card connector exposed. FIG. 3 is a front view of the card connector as seen from the direction of arrow B of FIG. 1. FIG. 4 is a partly cutaway plan view of the card connector when the card is inserted.

The card connector 1 is mounted on electronic devices such as cellular phones, PDAs, portable audio devices and cameras.

The card connector 1 shown in FIGS. 1 to 4 can be inserted with an IC card 20. On the back surface of the IC card 20 are arranged a plurality of contact pads 21 connected to IC circuits in the card. The IC card 20 has a chamfered portion 22 formed at its front end on one side to prevent an erroneous insertion of the card. The IC card 20 also has stepped portions 23 formed at its both side edges on the underside. One side surface of the card 20 is formed with a notch (recessed portion) 24 in which a write protect button 25 is arranged slidable in the card insertion direction. Moving the write protect button 25 to one position prevents the card from being overwritten.

In FIGS. 1 to 4, the card connector 1 has a connector housing 30 formed in one piece of an insulating material such as resin.

A base plate 31 of the connector housing 30 is formed with a plurality of press-fit grooves 32 which position and receive under pressure a plurality of contact terminals 40 each formed of a contact leaf spring. These contact terminals 40 include a power supply terminal and signal terminals. Contact portions 40a protruding upward at the front ends of the contact terminals 40 engage corresponding contact pads 21 formed on the card 20. A terminal portion 40b of each contact terminal 40 is soldered to the associated contact pad on a printed circuit board of the electronic device. These contact terminals 40 make electrical connection between the card 20 and the electronic device and at the same time produce an appropriate card holding force by their elasticity when the card is inserted.

The IC card 20 is inserted into the connector 1 through a card insertion opening 33 formed in the front face of the housing 30.

The connector housing 30 has an abutment wall 35 against which presses the inserted IC card 20. The abutment wall 35 has at one corner a corner wall 36 (see FIG. 4) against which the chamfered portion 22 of the IC card 20 is pressed.

The housing 30 has a pair of guide grooves 50a, 50b at both side portions which support the stepped portions 23 at the side edges of the IC card 20 as it is guided in the connector 1 in the insertion/retraction direction.

Side walls 51 extend downwardly from the edges of bottom walls of the guide grooves 50a, 50b and a lower portion of the card 20 is accommodated in a housing space defined by the side walls 51.

On the far side of the abutment wall 35 in the housing 30, an accommodation space 37 for accommodating a card detect switch SW1 is formed. In this accommodation space 37 is installed a turned contact leaf spring (first spring piece) 60 forming one of two metal pieces of the card detect switch SW1.

On the back part of the side wall portion of the housing 30 with respect to the card insertion direction is installed a stationary switch component (second spring piece) 70 that forms the other metal piece of the card detect switch SW1.

The contact leaf spring 60 and stationary switch component 70 are grounded at one of their ends and, at the other of their ends, applied with an appropriate voltage. In the card detect switch SW1, the contact portions of the contact leaf spring 60 and the stationary switch component 70 are come into or out of contact with each other according to whether the card 20 is inserted or not. Electrically detecting the on/off of the switch can check for the presence or absence of the card.

Figures 5A, 5B:
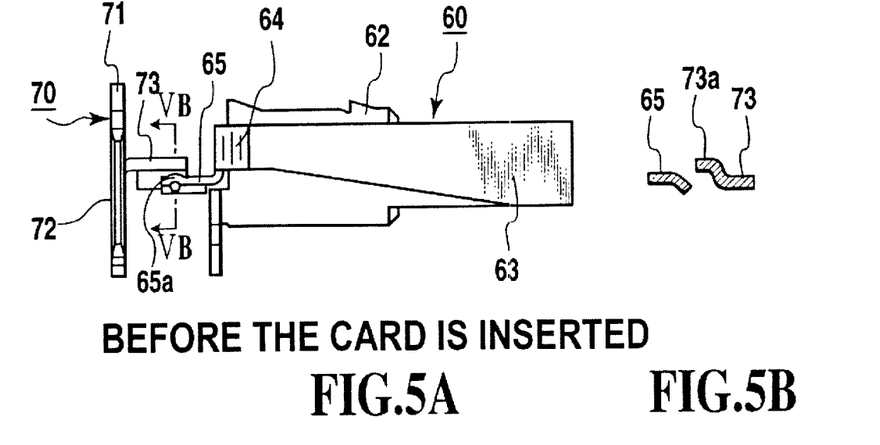
FIG. 5A is a detailed view of a card detect switch of the card connector according to the embodiment of the invention, showing a turn-off state of the switch.
FIG. 5B is a cross section taken along the line VB—VB of FIG. 5A.
Figures 6A, 6B:
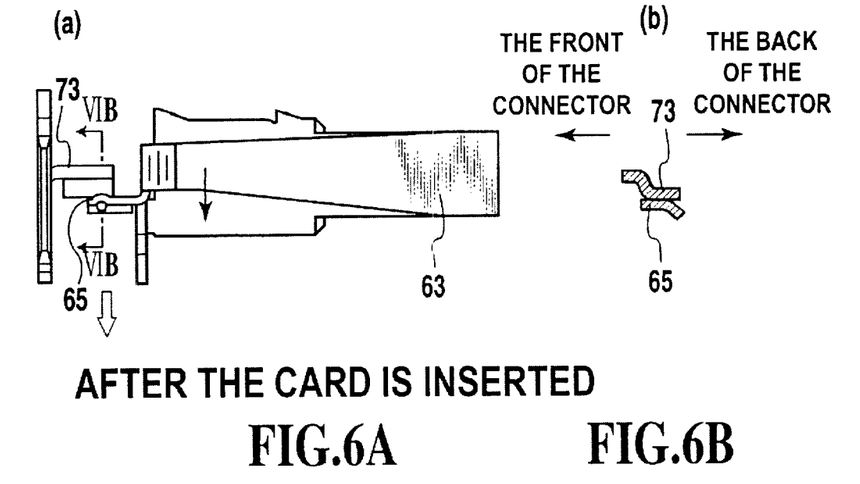
FIG. 6A is a detailed view of the card detect switch of the card connector according to the embodiment of the invention, showing a turn-on state of the switch.
FIG. 6B is a cross section taken along the line VIB—VIB of FIG. 6A.
Figure 7:
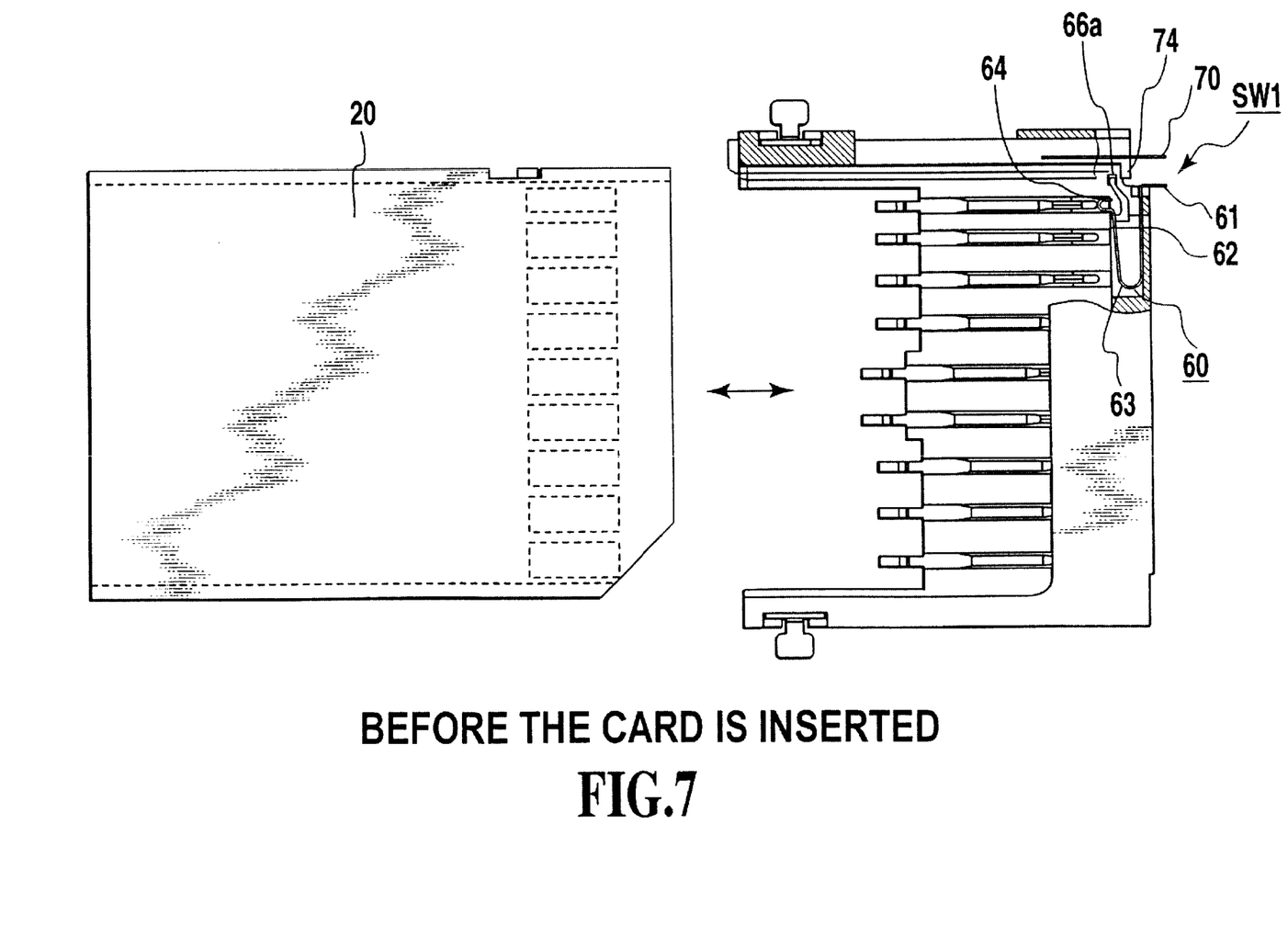
FIG. 7 is a partly cutaway plan view of the card connector according to a second embodiment of the invention, showing a state before the card is inserted.
Figure 8:
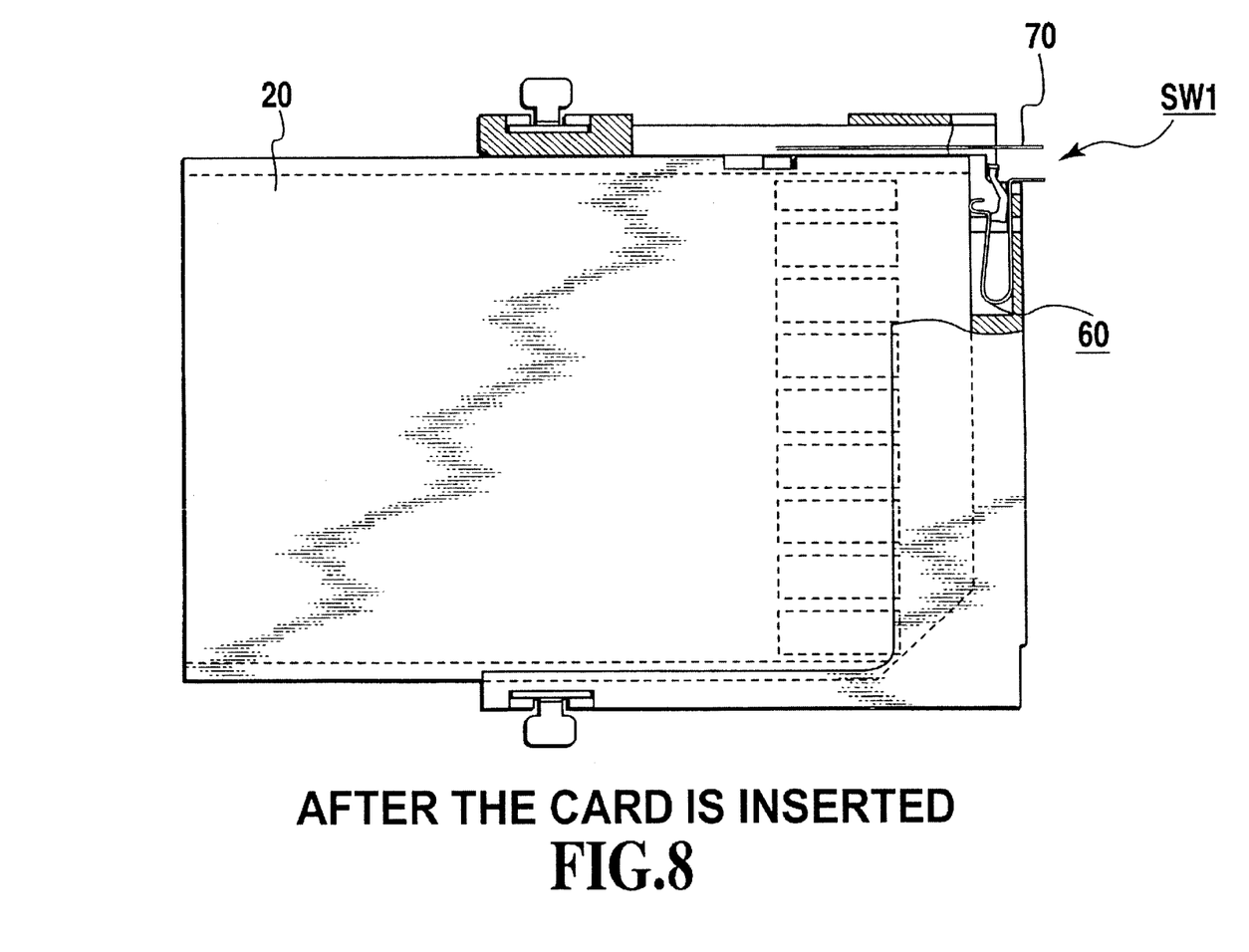
FIG. 8 is a partly cutaway plan view of the card connector according to a second embodiment of the invention, showing a state after the card is inserted.
Figure 9A:
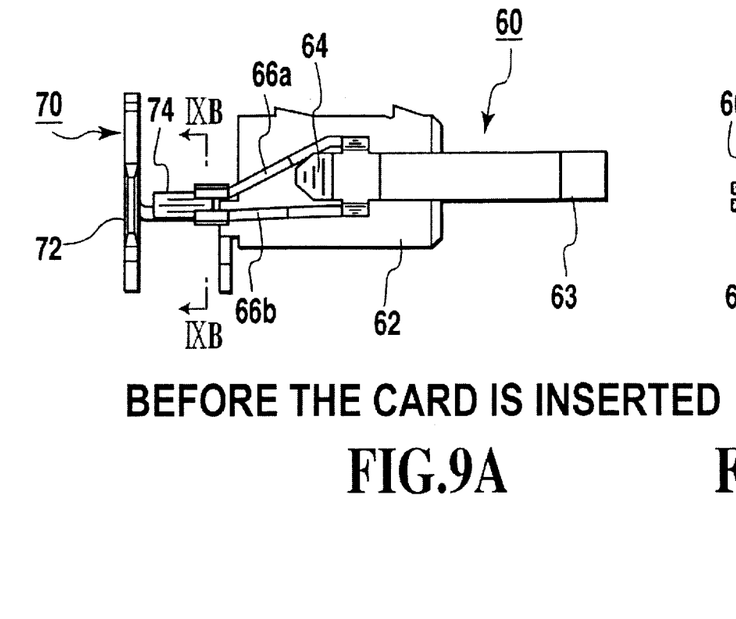
FIG. 9A is a detailed view of the second embodiment of the invention, showing a turn-off state of the switch.
Figure 9B:
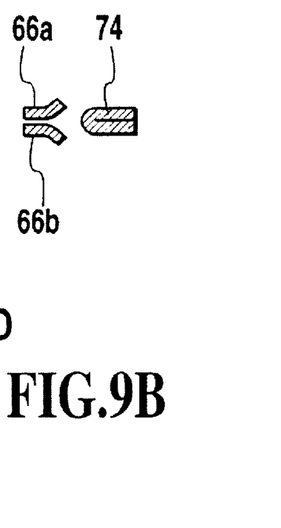
FIG. 9B is a cross section taken along the line IXB—IXB of FIG. 9A.

FIGS. 5A and 5B and FIGS. 6A and 6B show a more detailed structure of the card detect switch SW1. FIGS. 5A and 5B show a state of the switch before the card is inserted, and FIGS. 6A and 6B a state of the switch after the card is inserted. FIG. 5B is a cross section taken along the line VB—VB of FIG. 5A, and FIG. 6B is a cross section taken along the line VIB—VIB of FIG. 6A.

The contact leaf spring 60 is formed of a metal piece which has a terminal portion 61 connected to a contact pad of the printed circuit board, a stationary portion 62 secured to the wall of the housing 30, a turned spring piece portion 63, an protruded pushed portion 64 that is pushed by the front end face of the inserted card 20, and a contact piece 65 that engages a contact piece 73 of the stationary switch component 70. The contact piece 65 has a raised portion 65a formed on its upper surface which engages the contact piece 73 of the stationary switch component 70. A front end of the contact piece 65 with respect to the card insertion direction is bent downward as shown in FIGS. 5B and 6B. The contact leaf spring 60 can of course be elastically displaced in the card insertion direction but it can also be elastically displaced to some degree in the vertical direction, i.e., in the direction of the card thickness.

The stationary switch component 70 has a stationary portion 72 secured to the housing 30 and having a terminal portion 71 connected to a contact pad of the printed circuit board, and a contact piece 73 supported at one end on the stationary portion 72. The contact piece 73 is situated at almost the same vertical position of the contact piece 65 as shown in FIG. 5B. A front end 73a of the contact piece 73 on the card insertion opening 33 side is bent upward so that it does not collide with the contact piece 65, i.e., it can easily displace the contact piece 65 downward.

In this construction, when the card 20 is not inserted in the connector 1, the contact piece 65 of the contact leaf spring 60 and the contact piece 73 of the stationary switch component 70 are separated from each other, as shown in FIG. 2 or FIGS. 5A and 5B, and the card detect switch SW1 is in the off state.

When the card 20 is inserted into the connector 1, the pushed portion 64 of the contact leaf spring 60 is pushed by the front end face of the card 20, causing the spring piece portion 63 of the contact leaf spring 60 to elastically displace in the card insertion direction. As a result of this elastic displacement, the contact piece 65 of the contact leaf spring 60 moves to the position of the contact piece 73 of the stationary switch component 70. When the contact leaf spring 60 is further elastically displaced toward the far side by the pressing force of the card 20, the contact piece 65 is pushed down by the reactionary force from the contact piece 73 because the lateral movement of the contact piece 65 is restricted by the contact piece 73. As a result, the spring piece portion 63 of the contact leaf spring 60 is elastically displaced downward, moving the contact piece 65 downward. The contact piece 65 thus slides under the contact piece 73, with the result that both the contact pieces 65 and 73 are come into sliding contact with each other through their contact surfaces disposed parallel to the top and bottom surfaces of the inserted card 20. The card detect switch SW1 now turns on.

As described above, the contact leaf spring 60 and the stationary switch component 70 are pressed against each other with a pressing force acting in a direction of card thickness, i.e., in the direction of height of the connector 1.

In this embodiment therefore, a predetermined contact pressure required between the contact leaf spring 60 and the stationary switch component 70 when they engage can be produced by the pressing force acting in the direction of height of the connector (direction of card thickness). Hence, with this embodiment, it is no longer necessary to produce an additional displacement of the contact leaf spring 60, as is required with the conventional technology, to obtain a predetermined contact pressure. This allows the reactionary force of the contact leaf spring 60 to be set smaller, which in turn obviates the need to provide a brake piece for preventing the card from coming off and enables the card to be held stably and reliably in the connector.

While in the above embodiment, the contact leaf spring 60 and the stationary switch component 70 engage each other with a pressing force acting in the direction of card thickness, i.e., in the direction of height of the connector 1, the similar effect to the above embodiment can also be expected to be produced by engaging the contact leaf spring 60 and the stationary switch component 70 with a contact pressure acting in the lateral direction of the connector 1 (the card width direction) as indicated by an arrow C of FIG. 2. In that case, the contact pieces 65, 73 are engaged through their contact surfaces disposed almost perpendicular to the top and bottom surfaces of the card being inserted. The contact leaf spring 60 is arranged to be displaceable to some degree also in the lateral direction of the connector 1 (card width direction).

Next, a second embodiment of this invention will be described by referring to FIGS. 7 to 10A and 10B.

In this embodiment, the structures of the contact portions of the contact leaf spring 60 and the stationary switch component 70 are modified.

In these figures, the spring piece portion 63 of the contact leaf spring 60 is provided at its front end with a pair of vertically arranged grip pieces 66a, 66b. These grip pieces 66a, 66b are supported like a cantilever and elastically displaced in the vertical direction. The paired grip pieces 66a, 66b constitute contacts on the contact leaf spring 60 side.

The stationary switch component 70 is provided with a folded contact piece 74, which is disposed at a position where it can be clamped by the grip pieces 66a, 66b.

Figure 10A:
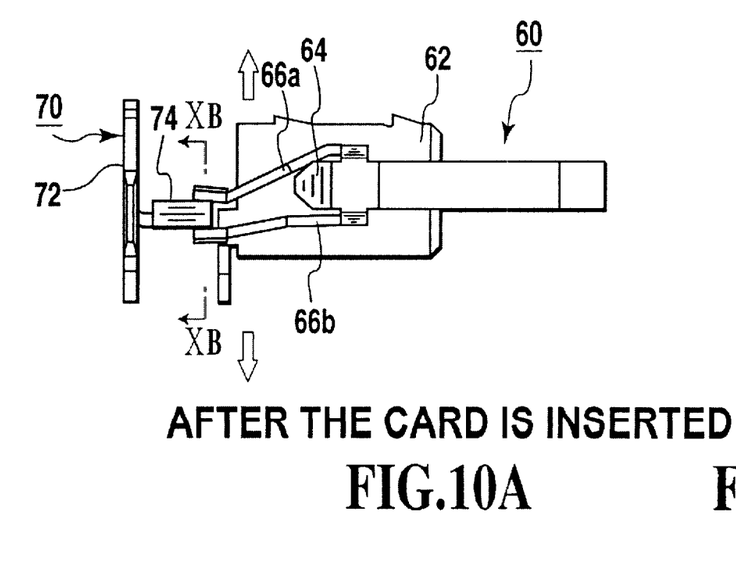
FIG. 10A is a detailed view of the second embodiment of the invention, showing a turn-on state of the switch.
Figure 10B:
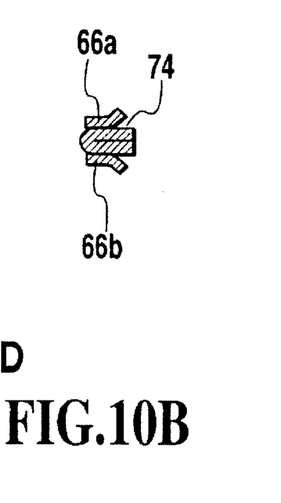
FIG. 10B is a cross section taken along the line XB—XB of FIG. 10A.

In this embodiment, when the card 20 is inserted into the connector 1, as in the previous embodiment, the pushed portion 64 of the contact leaf spring 60 is pushed by the front end face of the card 20, elastically displacing the spring piece portion 63 of the contact leaf spring 60 in the card insertion direction. As a result of this elastic displacement, the grip pieces 66a, 66b of the contact leaf spring 60 move to a position of the contact piece 74 of the stationary switch component 70. As the contact leaf spring 60 is further displaced elastically toward the far side of the connector by the pressing force of the card 20, the contact piece 74 fits between the grip pieces 66a, 66b elastically displacing them away from each other in the vertical direction, as shown in FIG. 10A and FIG. 10B. Hence, the contact piece 74 is held between the grip pieces 66a, 66b, turning on the card detect switch SW1.

As described above, because this embodiment holds one of the contact portions between the other contact portions, a strong contact pressure between the contact leaf spring 60 and the stationary switch component 70 can be secured. This contact pressure, as it does not act in the card insertion direction, produces no adverse effects on the card holding performance.

Next, a third embodiment of this invention will be described by referring to FIG. 11.

Figure 11:
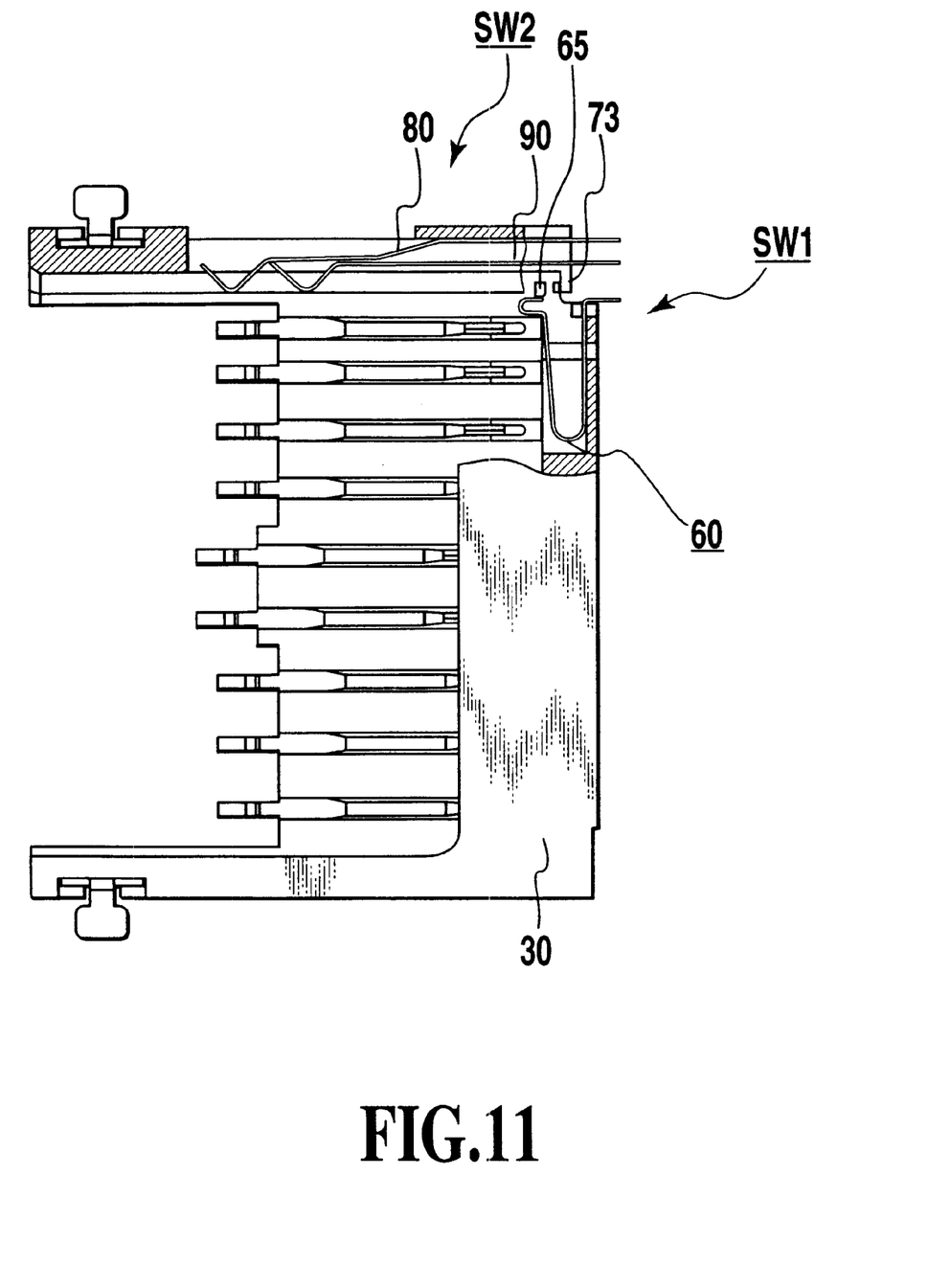
FIG. 11 is a partly cutaway plan view of a third embodiment of the invention, showing a turn-on state of the switch.

In FIG. 11, in the inner side wall of the connector housing 30 two contact leaf springs 80, 90 are arranged so that their front engagement portions are staggered. The position of the write protect button 25 of the card 20 is detected according to whether these two contact leaf springs 80, 90 are in or out of contact with each other. That is, a write protect detection switch SW2 is arranged such that when the write protect button 25 is slid to one position, the two contact leaf springs 80, 90 are parted and that when the write protect button 25 is slid to the other position, the two contact leaf springs 80, 90 are engaged.

At the far side of the connector 1, the card detect switch SW1 described earlier is installed. The card detect switch SW1 is made up of the contact leaf spring 60 and the contact piece 73 of the stationary portion of the contact leaf spring 90.

In the embodiment of FIG. 11, the contact leaf spring 90 is shared by the card detect switch SW1 and the write protect detection switch SW2. That is, in this embodiment, when viewed in electrical terms, the contact leaf spring 90 as a common piece for SW1 and SW2 need only be connected to ground and the other contact leaf springs 60, 80 applied with appropriate voltages.

In this embodiment too, a predetermined contact pressure, which is required between the contact piece 65 of the contact leaf spring 60 forming the card detect switch SW1 and the contact piece 73 provided at the stationary portion of the contact leaf spring 90 when these contact pieces engage, is produced by the pressing force acting in the connector height direction (card thickness direction).

Although in this embodiment the contact leaf spring 60 is of a turned type, any other desired configuration may be adopted.

Further, as to the shape and material of the connector housing and the kind of card to be inserted, any desired specifications may be adopted.

The present invention hat been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true spirit of the invention.

What is claimed is:

1. A card detect switch for a card connector for checking an insertion of a card into the card connector, comprising:
   a first metal piece elastically deformable in a card insertion direction and in a card thickness direction and having a first contact surface disposed almost parallel to top and bottom surfaces of the card being inserted; and
   a second metal piece having a second contact surface almost parallel to the first contact surface;
   wherein when the card is inserted, the first contact surface of the first metal piece and the second contact surface of the second metal piece come into sliding contact.

2. The card detect switch for a card connector according to claim 1, having a contact clamping structure in which one of a first contact portion including the first contact surface and a second contact portion including the second contact surface clamps the other.

3. A card detect switch for a card connector for checking an insertion of a card into the card connector, comprising:
   a first metal piece elastically deformable in a card insertion direction and in a card width direction and having a first contact surface disposed almost perpendicular to top and bottom surfaces of the card being inserted; and
   a second metal piece having a second contact surface almost parallel to the first contact surface;
   wherein when the card is inserted, the first contact surface of the first metal piece and the second contact surface of the second metal piece are brought into sliding contact.

4. The card detect switch for a card connector according to claim 3, having a contact clamping structure in which one of a first contact portion including the first contact surface and a second contact portion including the second contact surface clamps the other.

* * * * *